UNITED STATES PATENT OFFICE.

MARCELLUS G. EDSON, OF MONTREAL, QUEBEC, CANADA.

MANUFACTURE OF PEANUT-CANDY.

SPECIFICATION forming part of Letters Patent No. 306,727, dated October 21, 1884.

Application filed September 3, 1884. (No specimens.)

*To all whom it may concern:*

Be it known that I, MARCELLUS GILMORE EDSON, of the city of Montreal, in the District of Montreal, Province of Quebec, Canada, have invented new and useful Improvements in the Manufacture of Peanut-Candy and Composition of Matter to be Made therewith; and I do hereby declare that the following is a full, clear, and exact description of the same.

This invention has reference to a new manufacture of peanuts to form a flavoring-paste from said peanuts and a composition of matter to form sweetmeats and candy therewith. I take peanuts and roast them in the ordinary manner, and having removed the shells, and preferably (but not necessarily) while the peanuts are yet warm, I place the said nuts in a grinding-mill, such a mill as is used for reducing grain, &c., to flour. Before the peanuts are placed in this mill its grinding or rubbing surfaces must be heated to a temperature of 100° Fahrenheit, or thereabout. If the peanuts were ground cold by a mill having cold grinding-surfaces, the result would be peanut-flour, which result is old and in use; but by heating the stones or other grinding-body of the mill before the peanuts are put into it (and maintaining the heat afterward) the peanuts will be ground into a fluid or semi-fluid state, which comes from the mill having the consistency of rather thick or heavy molasses or cream. This, after it has cooled down to about the ordinary temperature of the atmosphere—say 50° to 60° Fahrenheit—will set into a consistency like that of butter, lard, or ointment, and will again become fluid by raising its temperatue to about 100° Fahrenheit, and in this liquid form is easily mixed or compounded with flour or fluids.

The above described peanut-paste is particularly adapted for use in the manufacture of sweetmeats and candy, in which it forms a new composition of matter. I take, by weight, one part of the said peanut-paste and about seven parts of sugar, and then proceed to treat this substance thus formed in the ordinary way for the manufacture of sweetmeats and any form of candy required.

It is not considered necessary to give an account of the various ways the compound of peanut-paste and sugar may be treated to form sweetmeats and candy, as any person in the business of manufacturing these articles will at once know what is to be done without any further explanation.

I do not confine myself to the exact proportions of peanut-paste and sugar given above, as they may be changed to suit the strength of flavor of peanut-required.

What I claim, and wish to secure by Letters Patent, is as follows:

1. The manufacture of a paste of peanuts, which is produced by roasting the peanuts and then grinding them between heated surfaces, substantially as described.

2. The herein-described composition of matter to be used in the manufacture of sweetmeats and candy, consisting of a paste formed from peanuts, as described, compounded with sugar, substantially in the proportions set forth.

M. G. EDSON.

Witnesses:
CHARLES G. C. SIMPSON,
L. O. HETU.